Patented Jan. 12, 1926.

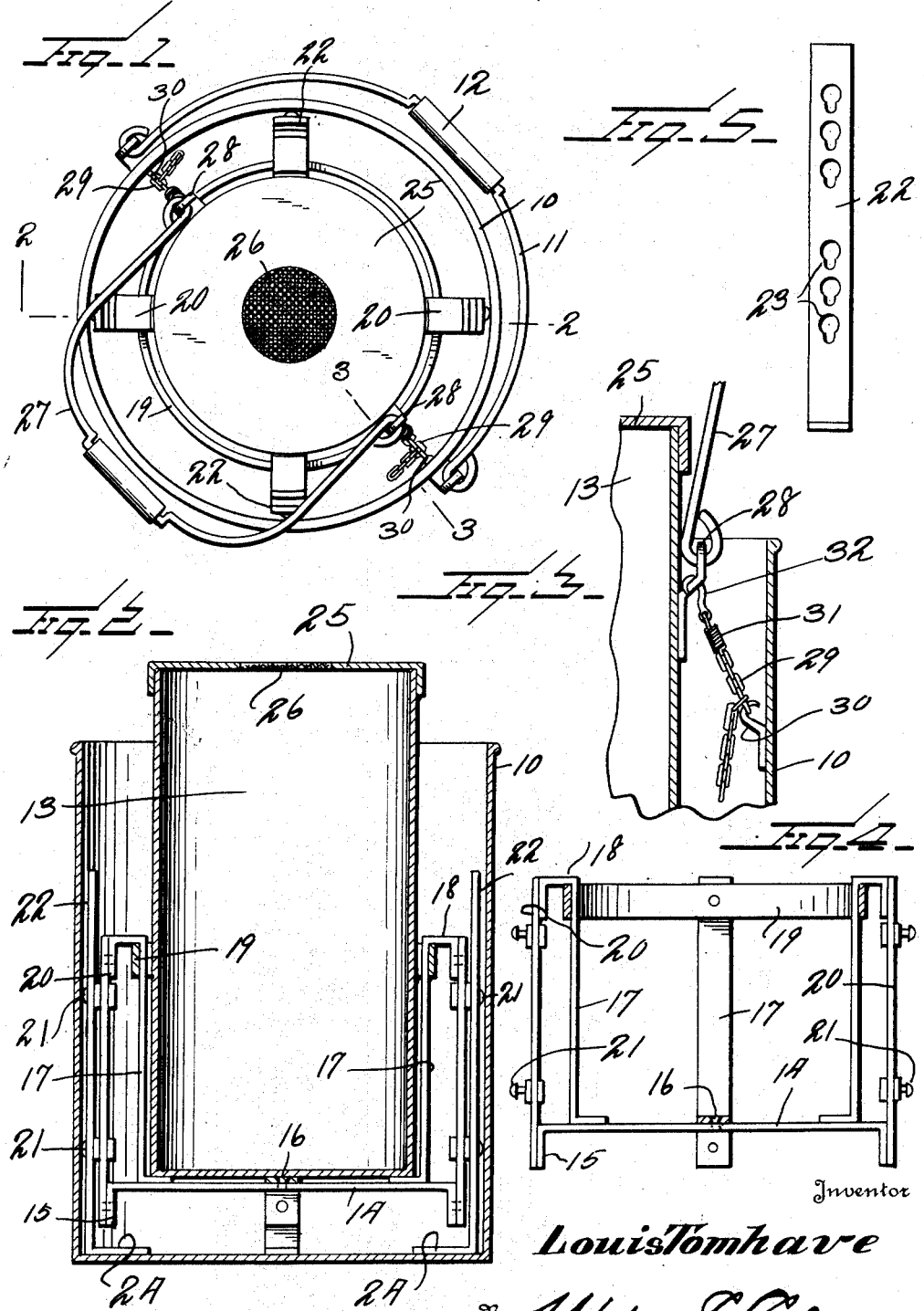

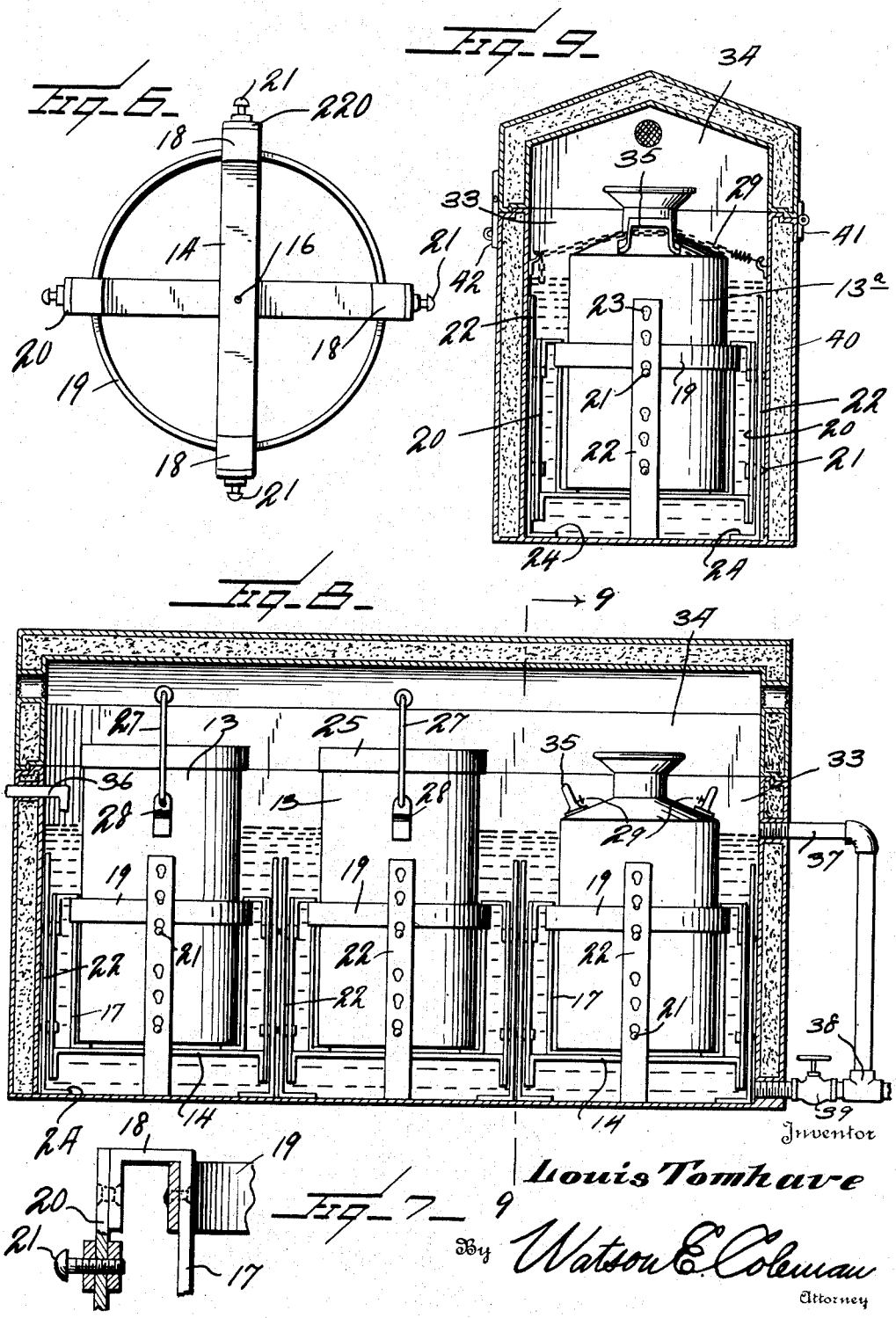

1,569,793

UNITED STATES PATENT OFFICE.

LOUIS TOMHAVE, OF FERGUS FALLS, MINNESOTA.

CREAM COOLER.

Application filed August 25, 1925. Serial No. 52,415.

*To all whom it may concern:*

Be it known that I, LOUIS TOMHAVE, a citizen of the United States, residing at Fergus Falls, in the county of Otter Tail and State of Minnesota, have invented certain new and useful Improvements in Cream Coolers, of which the following is a specification, reference being had to the accompanying drawings.

This invention relates to cream coolers, and the general object of this invention is to provide a cooler into which cream from a separator may be placed directly for the purpose of cooling the cream to thereby remove the animal heat therefrom. This method of cooling cream gives a better quality of cream than if the cream were allowed to cool in the slow and natural manner.

A further object is to provide a device of this character which includes an outer can or water container and a supporting structure adapted to be placed within this outer can and which is so constructed that the cream container may be disposed within the supporting structure with no danger of being tipped over, and this supporting structure will hold the cream container properly centered with relation to the water container so that water may pass beneath the bottom of the cream container and around the side thereof.

A still further object is to provide means for supporting the can, which support is adjustable vertically so as to accommodate cans of different heights or outer cans of differents depths.

Another object is to provide means for locking the can within the cooler which will resist the tendency of the can to rise up because of its buoyancy.

Other objects will appear in the course of the following description.

My invention is illustrated in the accompanying drawings, wherein:—

Figure 1 is a top plan view of a cream cooler constructed in accordance with my invention;

Figure 2 is a vertical section on the line 2—2 of Figure 1;

Figure 3 is a fragmentary vertical section on the line 3—3 of Figure 1;

Figure 4 is a vertical sectional view through the supporting means for the can, the supporting legs being omitted;

Figure 5 is an elevation of one of the supporting legs;

Figure 6 is a top plan view of the structure shown in Figure 4;

Figure 7 is an enlarged sectional detail view of the upper portion of the can supporting structure;

Figure 8 is a vertical sectional view through a cooler showing cans in place therein;

Figure 9 is a vertical section on the line 9—9 of Figure 8.

Referring to these drawings, and particularly to Figures 1 to 6, 10 designates the outer can or container designed to contain water. This can is provided, as illustrated, adjacent its upper end with a bail 11 and a handle 12. The cream can is designated 13 and this cream can is smaller in diameter than the water can so that the cream can may be inserted in the water can. For the purpose of supporting the cream can within the water can and supporting the cream can in spaced relation to the bottom of the water can, I provide a supporting frame or holder, illustrated particularly in Figures 4 and 6, consisting of a base formed by two crossed strips of metal 14. These are preferably one-sixteenth of an inch thick by one and a quarter inches wide and are preferably of galvanized iron. These strips at their extremities are bent downward. These strips cross each other at the middle and are riveted together, as at 16.

Riveted to these strips 14 and extending upward therefrom are four supporting strips 17 also formed of galvanized strap iron, these strips at their upper ends being outwardly turned, as at 18, and then downwardly bent. These strips are connected at their upper ends by means of a strap iron annulus 19 which is riveted to the upper ends of the strips. There is thus provided a structure having a base, upstanding supports having outwardly disposed ends 18 which, when disposed within the can 10, will be accurately centered therein, and then the cream can may be disposed within the area bounded by the four strips 17 and will be supported in centered relation to the water can and at the same time in spaced relation to the floor thereof.

Riveted to the downwardly turned ends of the strips 18 and to the downwardly turned ends 15 of the cross bars 14 is a vertical bar 20 which, as illustrated in Figure 7, is provided with the outwardly extending, headed studs formed by the screws 21. The head of this screw is adapted to engage in keyhole slots 23 formed in a vertical supporting bar or leg 22. This bar extends downward below the members 20 and is inwardly turned at its lower end to form feet 24 which rest upon the bottom of the outer container 10. This cream can is provided with the usual cover 25 having a reticulated strainer cloth 26 soldered to the cover over the central opening and constituting a vent. This cream can is shown as being provided with a bail 27 and ears 28 with which the bail is engaged.

For the purpose of holding the cream can 13 firmly down in place within the water can without regard to the amount of water in the can, I provide locking chains 29, as shown in Figure 3, which are engaged with hooks 30 riveted to the sides of the water can 10, these chains having in their length the springs 31 and at their upper ends being formed with hooks 32 adapted to engage with the usual ear 28 with which the bail 27 is engaged. The chains 29 may be let out to any desired extent or engaged with the hook 30 at any desired point so as to hold the cream can firmly in place.

In Figures 8 and 9 I have illustrated a relatively large cooler or container 33 having a lid 34 and which is designed to contain a plurality of cans 13 or such a can as designated 13ª and, of course, contain the supporting frame therefor. In this case a plurality of the supporting frames are disposed within the container 33. Where cream cans 13ª of the shape of the ordinary milk can are used, the chains 29, as shown in Figure 9, may be used for holding the cans in place, these chains simply extending over the ordinary handles 35 on the cans 13ª. Of course it will be understood that the container 33 is provided with a water inlet pipe 36 and upper and lower water outlet pipes 37 and 38, the latter being provided with a valve 39.

Cream is first placed in the small cooling cans 10, as shown in Figure 2, and then afterwards the cans 13 are transferred to the cooler 33 where the cooling water continuously circulates. It will be seen that this supporting structure is very simple, thoroughly effective, and that the cans are locked within the supporting frame and that these frames do not in any way interfere with the passage of water entirely around the can.

In Figures 8 and 9 the large cooler or container 33 and its lid 34 may be double walled to provide for insulation 40 being placed between these walls. It is to be understood, however, that this insulation may be of any suitable insulating material and that the double walls may simply enclose an air space for insulating purposes. The cover 34 is hinged to the body 33 by means of the hinges 41 and is held closed when cans of milk are cooling by means of a hasp or like device 42. Means should be provided for preventing the cover from swinging clear back when it is open.

I claim:—

1. A structure for supporting cream cans within water cans comprising a base formed of metallic strips and having vertically extending members adapted to be disposed and centered within the water can, vertical members extending upward from the base inward of the first named members to receive between them the cream can, and circular braces attached to the upper ends of the second named members.

2. A structure for supporting cream cans within water cans comprising a base having vertically extending members adapted to fit around the cream can, the base and the vertically extending members being outwardly extended, vertical strips connecting the outwardly extending ends of the base and of the vertically extending members, and legs operatively connected to said vertical strips.

3. A structure for supporting cream cans within water cans comprising a base having vertically extending members adapted to fit around the cream can, the base and the upper ends of the vertically extending members being outwardly extended, vertical strips connecting the outwardly extending ends of the base and of the vertically extending members, and legs operatively connected to said vertical strips for vertical adjustment.

4. A structure for supporting cream cans within a water can comprising a base formed of metal strips and having vertically extending legs adapted to be disposed and centered within the water can, vertical members extending upward from the base inward of the legs and spaced from each other and adapted to receive between them the cream can, and vertical members disposed exteriorly of said legs and extending down below the same and adapted to rest upon the bottom of the water can, said legs and said last named vertical members being formed, one with a vertical series of keyhole slots and the other with headed pins adapted to engage in said slots.

5. A structure for supporting cream cans within water cans comprising a base formed of crossed metallic strips, vertical strips attached to the crossed strips and extending upward therefrom and adapted to fit relatively closely around the cream can, the upper ends of said strips being connected by an annular strip, the upper ends of said strips extending radially outward and then downward, vertical members attached to the last named downwardly extending ends and to the downwardly extending ends of the crossed strips, said vertical members having outwardly projecting headed pins, and legs having a plurality of keyhole slots within which said pins are adapted to be engaged, said legs extending below the crossed strips and being adapted to fit within the water can.

In testimony whereof I hereunto affix my signature.

LOUIS TOMHAVE.